Oct. 14, 1969 H. W. HARKER 3,472,266
STARTER FOR SIPHON PIPE
Filed Oct. 24, 1967

INVENTOR
HALLACE W. HARKER
BY C. Harvey Gold
HIS ATTORNEY

United States Patent Office 3,472,266
Patented Oct. 14, 1969

3,472,266
STARTER FOR SIPHON PIPE
Hallace W. Harker, Rte. 2, Box 292,
Shelley City, Idaho 83274
Filed Oct. 24, 1967, Ser. No. 677,680
Int. Cl. F16l 55/14; F04f 10/02
U.S. Cl. 137—142                                  7 Claims

ABSTRACT OF THE DISCLOSURE

A starter for siphon pipes comprising a gasketed plate held in co-acting relationship with the discharge end of a pipe by a positioning sleeve secured to the plate which is sized to slide into said discharge end while leaving an annular opening between the interior of the pipe and the sleeve. A pipe clamp which is secured to the end plate with an elastic connector is affixed to the siphon pipe for urging the plate towards the discharge end of the pipe. The pipe clamp can be provided with elongated handles so that the starter can be used by an individual in a standing position.

---

This invention relates to a device for starting water flow through a siphon pipe of the type commonly used for irrigation purposes.

In recent years the use of siphon pipes has become very popular for transferring water from a supply canal, or the like, to an irrigation ditch used to water plant growth along the ditch. Such pipes have essentially eliminated the need for inter-connecting ditches between the supply canal and the irrigation ditches. While the siphon pipes have proven to be entirely suited for their intended purpose, i.e., transferring water over a canal bank and into an irrigation ditch at a level below the water level in the canal, they are difficult to start and often require the farmer using the pipes to get down on his knees on the ground to manipulate the pipe until water begins to flow therethrough. As a result, various devices such as suction pumps and the like have been made to alleviate the starting problems. However, such devices, while being costly, have not proven to be entirely satisfactory since they often pump an insufficient amount of water to start a siphon flow.

It is the principal object of this invention to provide a starting device for siphon pipes which is inexpensive to construct and yet which is easily operated by an individual in a standing position.

Briefly, the invention comprises a starter for siphon pipes which comprises an end plate, sized to be positioned over the open discharge end of the siphon pipe to block the flow of water therethrough, held in co-acting relationship with said discharge end by a positioning sleeve secured to the end plate and which is sized to slide into the siphon pipe's discharge end. A pipe clamp which is secured to the end plate with elastic connector means is affixed to the siphon pipe for urging the plate towards the discharge end of the pipe. Preferably, the pipe clamp is provided with elongated outwardly extending clamping handles so that the individual using the starter can grasp the siphon pipe with the clamp while remainnig in a standing position. To start the flow of water through the pipe, the starter, after being clamped to the pipe's discharge end, is vigorously moved back and forth resulting in a pumping action which initiates the siphon flow.

So that the invention may be more readily understood and carried into effect, reference is made to the accompanying drawings which are offered by way of example only and are not to be taken as limiting the invention, the scope of which is defined by the appended claims, which obviously embrace equivalent structures and processes.

Figure 1:
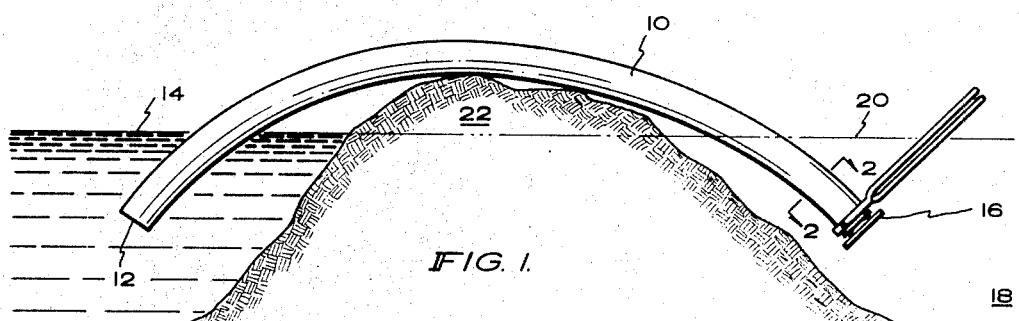
FIGURE 1 is a plan elevation view of a siphon pipe positioned with one end in a supply canal and its discharge end positioned in an irrigation ditch for irrigation purposes. The starter of this invention is shown clamped to the discharge end of the pipe.
Figure 2:
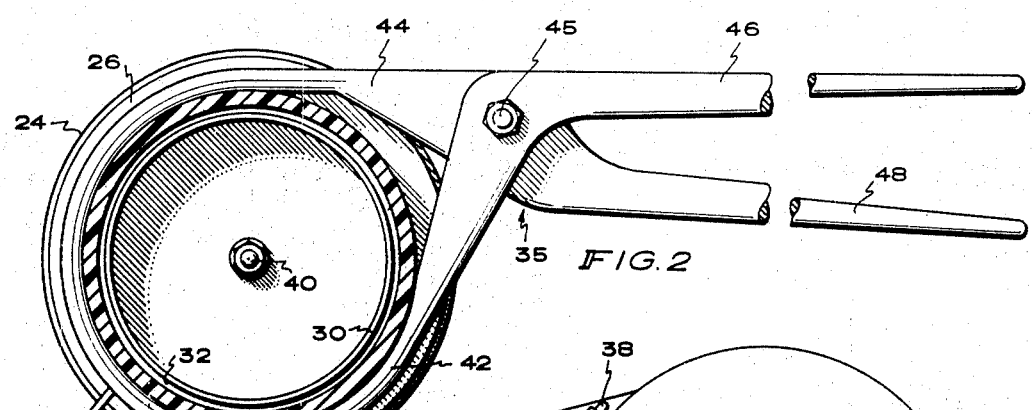
FIGURE 2 is a sectional view of FIGURE 1 taken along the plane line 2—2.
Figure 3:
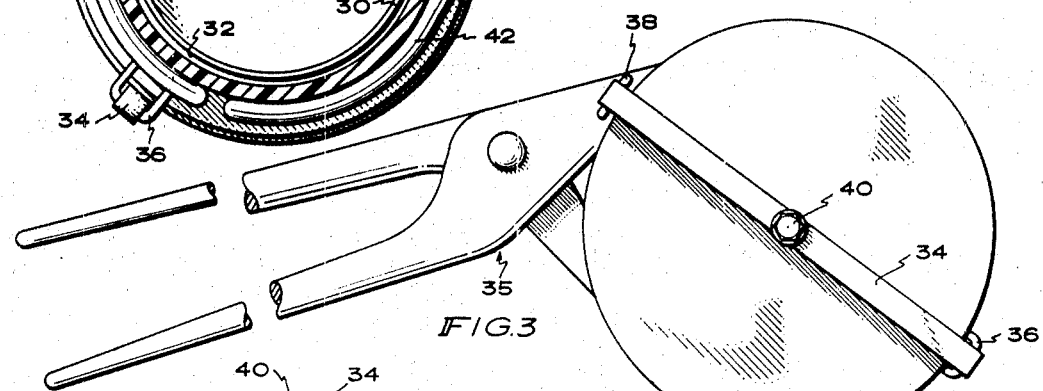
FIGURE 3 is an end view of the starter particularly showing the elastic connection between the pipe clamp and the starter's end plate.
Figure 4:
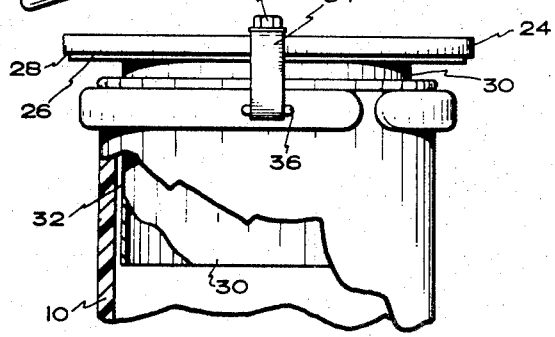
FIGURE 4 is a side elevation view of the starter secured to a siphon pipe. For purposes of clarity, the siphon pipe is shown partially broken away.

Referring now more particularly to the drawings, there is shown a siphon pipe 10 with its intake end 12 positioned in a supply canal 14 and its discharge end 16 arranged to pass water into an irrigation ditch 18 which is at an elevation lower than the level 20 of the water in the supply canal. Canal 14 is of course separated from irrigation ditch 18 by a mound of earth 22 over which the water must flow before it can be used for irrigation purposes. This water transfer is made possible through a siphon action which is well-known and only requires that the entire discharge end 16 of pipe 10 be at an elevation lower than water level 20 once the siphon flow is started. The starter of this invention, herein after described in detail, used for initiating the siphon flow is shown secured to the discharge end 20 of pipe 10.

The starter comprises an end plate 24 sized to cover the discharge end 16 of siphon pipe 10. A gasket 26, formed from a pliable material such as rubber, leather, plastic, fabric, and the like, is preferably secured to front face 28 of end plate 24 so that a water tight seal is formed between the gasket and discharge end 16 of the pipe when end plate 24 is urged against the discharge end. A positioning member 30 is secured to end plate 24 for holding the end plate in a proper coacting relationship with the end of pipe 10. The member is shaped to fit within the interior of pipe 10 so that is sidewalls 32 are preferably substantially parallel with the interior of pipe 10, i.e., when the pipe is tubular shaped, positioning member 30 is an elongated cylindrical member, and is sized to be spaced apart from the interior sidewalls of the pipe about $\frac{1}{16}$ to $\frac{1}{2}$ inch. Most preferably the positioning member is tubular shaped so that is has a hollow interior which fills with water when the starter is used.

End plate 24 is connected with an elastic member, or the like, to a pipe clamp 35 which is adapted to be securely affixed to pipe 10. The elastic member preferably comprises at least one elongated strap 34 constructed from a rubbery material, a metal spring, or the like, which will substantially return to its original shape after being stretched or otherwise deformed along its elongated axis. Elastic strap 34 is connected at its opposite ends to connector rings 36 and 38 which are affixed to the clamp 35 and, in addition, strap 34 is secured to end plate 24 with bolt 40 which preferably passes through the approximate center or midportion of the end plate. Clamp 35 is most preferably a pincher-type clamp having jaw sections 42 and 44 pivotly connected together with bolt 45 so that they co-act in a scissor-like fashion. Elongated handles 46 and 48 are connected to jaw sections 42 and 44 respectively so that the sections are closed by urging the handles together. Both connector rings 36 and 38 are preferably either secured to jaw 44 or to jaw 42 so that one jaw is always free to move without imparting movement to end plate 24.

In using the starter of this invention, positioning member 30 is slid into discharge end 16 of pipe 18 whereupon the jaws of clamp 35 are positioned about pipe 10 so that elastic strap 34 holds gasket 26 against the end of pipe 10. The individual operating the starter then grasps handles 46 and 48 and moves them back and forth to manipulate the discharge end of the pipe in a direction transverse to the pipe's longitudinal axis. By vigorously manipulating the pipe in this fashion, end plate 24 moves away from the end of pipe 10 whereupon it is immediately urged back to a sealing position with elastic member 34 to thereby induce a pumping action. This action causes water to be drawn through the pipe until a siphon flow is started. When this occurs, handles 46 and 48 are released to allow the clamp jaws to be withdrawn from about pipe 10 facilitating the removal of positioning member 30 from the interior of the pipe.

I claim:

1. A starter for a siphon pipe which comprises an end plate having a front face sized to be positioned over the open discharge end of said siphon pipe; positioning means secured to the front face of said end plate and sized to slide into the discharge end of said pipe for holding said front face of said end plate in a co-acting relationship with said discharge end of said pipe; a pipe clamp adapted to be affixed to said siphon pipe; and elastic connector means secured to said pipe clamp and to said end plate for urging said end plate against said discharge end of said siphon pipe when said clamp is affixed to said pipe.

2. The starter of claim 1 wherein the front face of said end plate which co-acts with the discharge end of said siphon pipe has gasket means secured thereto for forming a water tight seal between said end plate and said pipe.

3. The starter of claim 2 wherein said positioning means is tubular shaped.

4. The starter of claim 3 wherein said tubular shaped positioning means is sized to be spaced apart from the interior sidewalls of the siphon pipe $\frac{1}{16}$ to $\frac{1}{2}$ inch.

5. The starter of claim 3 wherein said pipe clamp is provided with elongated outwardly extending handles for manipulating said clamp.

6. The starter of claim 5 wherein said elastic connector means is an elastic strap connected at its opposite ends to said pipe clamp and connected at its midportion to the back face of said end plate.

7. The starter of claim 6 wherein said elastic strap is a rubber strap.

References Cited

UNITED STATES PATENTS 2,959,184   11/1960   Mahan _____ 137—142 X

M. CARY NELSON, Primary Examiner

MICHAEL O. STURM, Assistant Examiner